United States Patent [19]

Hoch et al.

[11] 4,189,582

[45] Feb. 19, 1980

[54] PROCESS FOR UPGRADING THE COLOR VALUE OF 3,4,9,10-TETRACARBOXYLIC ACID N,N'-BIS-METHYLIMIDE

[75] Inventors: Helmut Hoch; Heinrich Hiller, both of Wachenheim, Fed. Rep. of Germany

[73] Assignee: BASF Aktiengesellschaft, Rheinland-Pfalz, Fed. Rep. of Germany

[21] Appl. No.: 913,332

[22] Filed: Jun. 7, 1978

[30] Foreign Application Priority Data

Jun. 18, 1977 [DE] Fed. Rep. of Germany ....... 2727484

[51] Int. Cl.$^2$ ..................... C07D 471/06; C09B 9/00; C09C 3/06
[52] U.S. Cl. ................................ 546/37; 106/288 Q; 106/308 R; 106/308 Q; 106/309
[58] Field of Search ................. 260/281 P; 106/288 Q, 106/308 R, 309; 546/37

[56] References Cited

U.S. PATENT DOCUMENTS

| | | | |
|---|---|---|---|
| 1,913,052 | 6/1933 | Jaeger et al. | 260/281 P |
| 2,893,994 | 7/1959 | Helfaer et al. | 260/281 P |
| 3,331,847 | 7/1967 | Gerson et al. | 260/281 P |
| 3,628,976 | 12/1971 | Stocker | 260/281 P |

FOREIGN PATENT DOCUMENTS 2440756  4/1976  Fed. Rep. of Germany ............... 8/34

*Primary Examiner*—Floyd D. Higel
*Attorney, Agent, or Firm*—Oblon, Fisher, Spivak, McClelland & Maier

[57] ABSTRACT

A process for the manufacture of a red pigment from perylene-3,4,9,10-tetracarboxylic acid N,N'-bis-methylimide which has been obtained by methylating the corresponding diimide or by fusing naphthalic acid N-methylimide with an alkali metal hydroxide which comprises vatting a suspension of N,N'-bis-methylimide dye with 0.5–1.5 times by weight of an alkali metal dithionite in the presence of up to 4 times by weight of an alkali metal hydroxide relative to the quantity of the dithionite, at a temperature of from room temperature to 100° C., to obtain the corresponding leuco compound, cooling the resulting solution to 20°–40° C., isolating and washing the leuco compound with fresh vatting solution until the solution is virtually colorless and clean and then oxidizing the leuco compound.

9 Claims, No Drawings

PROCESS FOR UPGRADING THE COLOR VALUE OF 3,4,9,10-TETRACARBOXYLIC ACID N,N'-BIS-METHYLIMIDE

The present invention relates to a process for the manufacture of a tinctorially valuable pigmentary form of perylene-3,4,9,10-tetracarboxylic acid N,N'-bis-methylimide, the latter having been obtained by methylating the corresponding diimide or by fusing naphthalic acid N-methylimide with an alkali metal hydroxide.

Perylene-3,4,9,10-tetracarboxylic acid N,N'-bis-methylimide (I) has been known for a long time. The bis-methylimide (I) can be manufactured by (α) reacting perylene-3,4,9,10-tetracarboxylic acid dianhydride with methylamine (German Published Application DAS 2,153,087; Swiss Pat. No. 101,763), (β) methylating perylene-3,4,9,10-tetracarboxylic acid diimide in the presence of an alkali, for example with methyl chloride (German Published Application DAS 1,272,270, German Pat. No. 386,057) or (γ) fusing naphthalic acid N-methylimide with an alkali metal hydroxide (German Pat. No. 276,357).

Depending on the process of manufacture, the crude pigments give pigmentary forms which produce red or dull reddish brown hues.

According to the disclosures in German Published Application DAS 2,153,087 (column 1, lines 23/50) red pigments of perylene-3,4,9,10-tetracarboxylic acid N,N-bis-methylimide—hereinafter also referred to as N,N'-bis-methylimide—are only obtained from a N,N'-bis-methylimide which has been manufactured by reacting (condensing) perylenetetracarboxylic acid with methylamine.

In contrast, processes (β) and (γ) always give dull reddish brown products which even after comminution and finishing, for example by the processes described in German Published Application DAS 1,272,270, only give dull reddish brown pigments.

The manufacture of N,N'-dimethylimide from perylenetetracarboxylic acid dianhydride and methylamine is very expensive, since the tetracarboxylic acid dianhydride must be manufactured by hydrolyzing the diimide. The manufacture of the N,N'-bis-methylimide (I) by methylating the perylenetetracarboxylic acid diimide obtained in the synthesis would offer great advantages, provided a red pigment was obtainable by this method.

It is an object of the present invention to provide a method by means of which a red pigment can be produced from N,N'-bis-methylimide obtained by methylating perylenetetracarboxylic acid diimide or by fusing naphthalic acid N-methylimide with an alkli metal hydroxide.

We have found that this object is achieved and that a red pigment of perylene-3,4,9,10-tetracarboxylic acid N,N'-bis-methylimide, the latter having been obtained by methylating the corresponding diimide or by fusing naphthalic acid N-methylimide with an alkali metal hydroxide, is obtained by vatting the N,N'-bis-methylimide with an alkali metal dithionite in the presence of an alkali metal hydroxide at an elevated temperature and oxidizing the leuco compound, if the vatting is carried out at from room temperature to 100° C. and after vatting and cooling the leuco compound is isolated, extracted or washed with blank vat until the liquid (blank vat) is, or emerges, virtually colorless and clear, and then oxidizing the leuco compound obtained.

The red pigment obtained by the process according to the invention, and the pigmentary forms produced therefrom by conventional finishing methods, give transparent colorations of excellent fastness.

The process according to the invention is generally carried out by suspending the N,N'-bis-methylimide, obtained by methylating perylenetetracarboxylic acid diimide or by fusing naphthalic acid N-methylimide with an alkali metal hydroxide, in an aqueous alkaline medium at from room temperature to 100° C., preferably from 30° to 70° C., and vatting it by adding sodium dithionite. Hereupon, the N,N'-bis-methylimide is converted to the leuco compound, which precipitates. After cooling, advantageously to from 40° C. to room temperature, the leuco compound is isolated, for example by filtration. The filter residue is then either suspended in blank vat, filtered off and washed with blank vat, or is directly washed with blank vat on the filter until the filtrate emerges virtually colorless and a sample of the filtrate is transparent.

The leuco compound of the N,N'-bis-methylimide, purified in this way, is then oxidized to perylenetetracarboxylic acid N,N'-bis-methylimide in the conventional manner.

The crude starting material employed for vatting is advantageously used in the form of the aqueous press cake obtained from the process of manufacture.

Vatting as a rule is carried out in an amount of water which is from 20 to 60 times the amount of diimide. The amount of alkali metal hydroxide, preferably used in the form of sodium hydroxide, depends on the amount of sodium dithionite. In general, the amount of 50% strength by weight sodium hydroxide solution varies from an amount equal to the sodium dithionite to 4 times this amount. The required amount of sodium dithionite is from 0.5 to 1.5 times the amount by weight of the N,N'-bis-methylimide.

The vatting is advantageously carried out at from 30° to 70° C., especially from 35° to 50° C. Under the stated conditions, the process is complete in from 0.5 to 2 hours, after which the suspension is cooled to 40° C.–20° C., preferably to 30° C.–20° C. and, advantageously, the leuco compound is filtered off. The filter residue is then extracted with blank vat. The extraction can be carried out by either suspending the isolated leuco compound in from 15 to 30 times its amount of blank vat, filtering off the leuco compound and washing it with a small amount of blank vat, or directly washing the leuco compound on the filter with the stated amount of blank vat. The blank vat employed is a solution of 20 parts by weight of 50% strength by weight sodium hydroxide solution and 10 parts by weight of sodium dithionite in 1,000 parts by weight of water. Suspending the material in the blank vat or washing it with blank vat results in the extraction and removal of impurities.

The oxidation of the leuco compound of the N,N'-bis-methylimide can be carried out by various methods; conversion to the pigmentary form (finishing) may take place simultaneously.

As an example, the leuco compound can be made into a paste with water, with or without having added a dispersant to the water, and then reoxidized to the N,N'-bis-methylimide by means of an oxidizing agent.

Examples of suitable oxidizing agents are atmospheric oxygen, oxidizing salts, e.g. nitrates and chlorates, dilute oxidizing acids, e.g. dilute nitric acid, nitro compounds, e.g. 3-nitrobenzenesulfonic acid, and hydrogen peroxide and its adducts, e.g. sodium perborate and the like.

Depending on the rate of oxidation, the N,N'-bis-methylimide is obtained in a fine or a coarse crystalline form. The former is immediately usable for pigment purposes. However, it is advantageous first to convert the N,N'-bis-methylimide obtained into very finely divided pigmentary forms, which are of greater tinctorial strength, by conventional processes. Thus, a finely divided red pigment is obtained by dissolving the dried reoxidized N,N'-bis-methylimide in sulfuric acid of at least 90% strength by weight and pouring the solution into water containing one or more dispersants. A further possible way of finishing the pigment is, for example, to swell the dried and comminuted reoxidized N,N'-bis-methylimide in sulfuric acid of from 75 to 85% strength by weight at from 25° to 60° C. and then to pour out the sulfuric acid suspension into water, which may or may not contain one or more dispersants, and to isolate the pigment.

The dried, reoxidized N,N'-bis-methylimide can also be converted to a pigmentary form by milling with salt.

A finely divided red pigment is also obtained if the aqueous press cake of the reoxidized N,N'-bis-methylimide is mixed with dispersant and the mixture is subjected to high shearing forces, for example in kneaders. In this latter case, the formulations obtained are readily dispersible in water or in hydrophobic organid liquids, depending on the dispersant used.

Preferably, however, the oxidation of the leuco compound is carried out under conditions which directly result in a pigmentary form of high tinctorial strength.

For example, the oxidation of the leuco compound directly gives a very transparent red pigment if the leuco compound is milled, in aqueous suspension, in the presence of from 0.2 to 8% by weight of one or more dispersants (based on the leuco compound), by means of milling particles in the presence of an oxidizing agent. The milling is carried out at from 20° to 100° C., preferably from 60° to 80° C.

The oxidation takes place by introducing air during milling, or by adding an oxidizing agent, e.g. hydrogen peroxide or 3-nitrobenzenesulfonic acid (as the sodium salt) before and/or during milling.

The conventional milling particles may be used, e.g. glass beads, metal balls, ceramic balls or plastic balls or sand; these are employed in appropriate milling pots.

The amount of milling particles is as a rule from 20 to 40 times the amount by weight of the leuco compound.

A finely divided red pigment can also be obtained by oxidizing the leuco compound, if the leuco compound is first suspended in an alkaline solution of sodium dithionite in the presence of from 0.2 to 20, preferably from 0.5 to 8, % by weight of a dispersant, based on the leuco compound, the suspension being at from 20° to 100° C., preferably from 40° to 70° C., and then oxidizing the leuco compound with air, or preferably by adding hydrogen peroxide or 3-nitrobenzenesulfonic acid, at from 20° to 100° C., preferably from 60° to 80° C.

Advantageously, the alkaline solution contains from 0.6 to 1.5 parts by weight of sodium dithionite and from 1.0 to 3 parts by weight of 50% strength by weight sodium hydroxide solution per part by weight of leuco compound.

In the case of the two last-mentioned oxidation reactions, an anionic, non-ionic or, preferably, cationic dispersant may be used.

Examples of anionic dispersants are especially the alkali metal salts of the higher fatty acids and of the resin acids, especially the alkali metal salts of abietic acid.

Examples of suitable non-ionic dispersants are adducts of ethylene oxide with a higher fatty acid, a higher fatty acid amide, a higher fatty acid alkanolamide, an aliphatic alcohol, an aliphatic mercaptan, an amine, an alkylphenol, a rosin or a sperm oil alcohol, and mixtures of these adducts.

Preferred non-ionic dispersants are adducts of from 20 to 30 moles of ethylene oxide with 1 mole of tallow fatty alcohol or adducts of from 4 to 7 moles of ethylene oxide with 1 mole of oleic acid, since the pigments obtained in the presence of these agents are well-suited to the mass coloring of thermoplastics and the coloring of baking finishes.

Since particularly advantageous pigmentary forms are obtained directly from the reoxidation of the leuco compound if cationic dispersants are used, this type of oxidation is preferred.

Preferred cationic dispersants are quaternary ammonium salts, eg. trialkylphenylammonium (where alkyl is of 1 to 4 carbon atoms), trialkylbenzylammonium (where alkyl is of 1 to 4 carbon atoms), dialkyldibenzylammonium (where alkyl is of 1 to 4 carbon atoms), alkyltrialkylammonium (where the first alkyl is of 10 to 20 carbon atoms and the other three are of 1 to 4 carbon atoms each), dialkyldibenzylammonium (where one alkyl is of 10 to 20 carbon atoms and the other of 1 to 4 carbon atoms), trialkylammonium (where alkyl is of 1 to 4 carbon atoms), polyglycol ether, alkylpyridinium (where alkyl is of 12 to 18 carbon atoms) or N-alkylimidazolium (where alkyl is of 1 to 18 carbon atoms) chloride, bisulfate, sulfate, methylsulfate, benzenesulfonate and toluenesulfonate. Mixtures of the ammonium salts may also be used.

Specific examples of cationic dispersants in the form of chlorides are trimethyl-phenylammonium chloride, triethyl-phenylammonium chloride, tripropyl-phenylammonium chloride, dimethyl-dibenzylammonium chloride, diethyl-dibenzylammonium chloride, dimethyl-phenyl-benzylammonium chloride, trimethyl-benzylammonium chloride, lauryl-trimethylammonium chloride, lauryl-benzyl-dimethylammonium chloride, lauryl-methyl-dibenzylammonium chloride, laurylpyridinium chloride, cetylpyridinium chloride and benzylpyridinium chloride. Amongst the said cationic dispersants, lauryltrimethylammonium chloride, dimethyl-dibenzylammonium chloride, benzylpyridinium chloride and laurylpyridinium chloride are preferred, since transparent yellowish pigments of particularly high tinctorial strength are obtained in the presence of these dispersants.

Instead of the above chlorides, the corresponding bisulfates, sulfates, methylsulfates, benzenesulfonates or toluenesulfonates can be employed with equal success.

The red pigments obtained by the process of the invention may be used for the mass coloring of plastics, for spin dyeing and particularly for coloring surface coatings and printing inks.

In the above media, lightfast, weathering-fast and heat-fast colorations are obtained, which furthermore have excellent fastness to overcoating and to solvents.

Since the pigments obtained give transparent colorations, the red pigments obtained according to the process of the invention are particularly suitable for the production of red metallic finishes.

The Examples which follow illustrate the process of the invention. Parts and percentages in the Examples are by weight.

EXAMPLE 1

(a) 54 Parts of crude perylene-3,4,9,10-tetracarboxylic acid diimide (obtained by fusing naphthalimide with alkali) are introduced, whilst stirring, into a mixture of 1,000 parts of water and 125 parts of 50% strength sodium hydroxide solution in a stirred autoclave. After flushing with nitrogen, 75 parts of methyl chloride are forced in and the reaction mixture is heated for three hours at 100° C., kept at this temperature for 6 hours, and then cooled. After letting down, the suspension is transferred into a diluting vessel and brought to pH 6 with 10% strength sulfuric acid. The crude N,N'-bis-methylimide is filtered off and washed neutral. A reddish brown press cake is obtained, which is processed further either as obtained or after drying. Yield: 56 parts of crude perylene-3,4,9,10-tetracarboxylic acid, N,N'-bis-methylimide.

(b) 50 Parts of the crude perylene-3,4,9,10-tetracarboxylic acid N,N'-bis-methylimide obtained as described in (a) are suspended, in the form of the moist press cake, in 3,000 parts of water and after adding 80 parts of 50% strength sodium hydroxide solution and 40 parts of sodium dithionite the mixture is heated to 40°, kept at this temperature for 1 hour and then cooled to room temperature, and the crystals which precipitate are filtered off. The resulting filter residue, which is the leuco form of perylene-3,4,9,10-tetracarboxylic acid N,N'-bis-methylimide, is washed with 1,000 parts of blank vat (a solution of 20 parts of 50% strength sodium hydroxide solution and 10 parts of sodium dithionite in 1,000 parts of water). The resulting moist press cake is then worked into a paste with 500 parts of 10% strength sulfuric acid and is oxidized, filtered off and washed neutral. After drying, 44 parts of pure perylene-3,4,9,10-tetracarboxylic acid bismethylimide are obtained in the form of red crystals. This product can be converted to a particularly finely divided pigmentary form by the method described under (c).

(c) Finely divided pigment: 25 parts of dried bismethylimide obtained as described in (b) are introduced, in the course of one hour, into 250 parts of 80% strength sulfuric acid at from 20 to 25° C. The suspension is stirred at this temperature for 15 hours and then precipitated by introducing it into a solution, at 60° C., of 2.5 parts of an adduct of 5 moles of ethylene oxide with 1 mole of oleic acid and 1 part of an adduct of 23 moles of ethylene oxide with 1 mole of tallow fatty alcohol in 750 parts of water. The pigment is isolated from the suspension by filtration and is washed neutral and dried at 70° C. 27 parts of a red powder are obtained; this product is very easily dispersed in a baking finish and gives red colorations of excellent fastness and good transparency.

EXAMPLE 2

25 parts of the purified perylenetetracarboxylic acid N,N-bismethylimide obtained as described in Example 1 (b) are introduced into 250 parts of 80% strength sulfuric acid in the course of one hour at from 20° to 25° C. The suspension is stirred for 15 hours at the same temperature to allow the material to swell and is then introduced into a solution, at 60° C., of 2 parts of lauryl-trimethylammonium chloride in 750 parts of water. The pigment suspension is filtered and the filter residue is washed neutral and dried at 70° C. 26 parts of a red powder are obtained; the product is very easily dispersed in a baking finish and gives red colorations of excellent fastness and good transparency.

EXAMPLE 3

25 parts of the perylenetetracarboxylic acid bismethylimide obtained as described in Example 1 (b) are introduced into 250 parts of 80% strength sulfuric acid in the course of one hour at from 20° to 25° C. After stirring for 15 hours at from 20° to 25° C. to allow the material to swell, the mixture is introduced into 750 parts of water at 60° C. The pigment suspension is filtered and the product is washed neutral. The neutral press cake is stirred with 400 parts of water at 60° C., an alkaline solution of 2.5 parts of rosin soap (i.e. the sodium salt) is added and the suspension is stirred for 10 minutes. It is then brought to pH 6 with 10% strength sulfuric acid and is filtered, and the filter residue is washed neutral. 27 parts of a red pigment are obtained; this product may be easily dispersed in a baking finish and gives red colorations of excellent fastness, great depth of color and good transparency.

EXAMPLE 4

50 Parts of the crude perylene-3,4,9,10-tetracarboxylic acid N,N'-bis-methylimide obtained as described in Example 1 (a) are suspended, in the form of the moist press cake, in 3,000 parts of water and after adding 80 parts of 50% strength sodium hydroxide solution and 40 parts of sodium dithionite the mixture is heated to 40°, kept at this temperature for 1 hour and then cooled to room temperature, and the crystals which precipitate are filtered off. The resulting filter residue, which is the leuco form of perylene-3,4,9,10-tetracarboxylic acid N,N'-bis-methylimide, is washed with 1,000 parts of blank vat (a solution of 20 parts of 50% strength sodium hydroxide solution and 10 parts of sodium dithionite in 1,000 parts of water). The moist press cake of the leuco form is then suspended in a solution, at 60° C., of 2,000 parts of water, 40 parts of 50% strength sodium hydroxide solution, 20 parts of sodium dithionite and 2 parts of lauryl-trimethylammonium chloride. After 15 minutes, 70 parts of 30% strength hydrogen peroxide are added at 60° C. and the leuco compound is oxidized. Duration: 30 minutes. The suspension is filtered and the filter residue is washed neutral and dried at 70° C. Yield: 44 parts of a red pigment which is easily dispersed in a baking finish and gives red colorations of excellent fastness and good transparency.

EXAMPLE 5

50 Parts of the crude perylene-3,4,9,10-tetracarboxylic acid N,N'-bis-methylimide obtained as described in Example 1 (a) are suspended, in the form of the moist press cake, in 3,000 parts of water and after adding 80 parts of 50% strength sodium hydroxide solution and 40 parts of sodium dithionite the mixture is heated to 40°, kept at this temperature for 1 hour and then cooled to room temperature (25° C.), and the crystals which precipitate are filtered off. The filter residue, which contains the leuco form of perylene-3,4,9,10-tetracarboxylic acid bis-methylimide, is washed with 1,000 parts of blank vat (a solution of 20 parts of 50% strength sodium hydroxide solution and 10 parts of sodium dithionite in 1,000 parts of water). The moist filter cake of the leuco form is suspended in a solution, at 60° C., of 40 parts of 50% strength sodium hydroxide solution, 20 parts of sodium dithionite and 3 parts of a condensation product of β-naphthalenesulfonic acid with formaldehyde in 2,000 parts of water. After 15 minutes, 70 parts of 30% strength hydrogen peroxide are added at 60° C. and the leuco compound is oxidized. The suspension is filtered and the filter cake is washed neutral and dried at 70° C. Yield: 45 parts of a red pigment which is easily dispersed in a baking finish and gives red colorations of excellent fastness and good transparency.

EXAMPLE 6

50 Parts of the crude perylene-3,4,9,10-tetracarboxylic, acid N,N'-bis-methylimide obtained as described in Example 1 (a) are suspended, in the form of the moist press cake, in 3,000 parts of water and after adding 80 parts of 50% strength sodium hydroxide solution and 40 parts of sodium dithionite the mixture is heated to 40°, kept at this temperature for 1 hour and then cooled to room temperature, and the crystals which precipitate are filtered off. The resulting filter residue, which contains the leuco form of perylene-3,4,9,10-tetracarboxylic acid bis-methylimide, is washed with 1,000 parts of blank vat (a solution of 20 parts of 50% strength sodium hydroxide solution and 10 parts of sodium dithionite in 1,000 parts of water).

The moist filter cake of the leuco form is converted to a paste, with a solids content of 15%, by adding water. The aqueous paste obtained, constituting 295 parts, is mixed with an alkaline solution containing 3.8 parts of rosin soap in the form of the sodium salt, and after adding 850 parts of glass beads (diameter from 0.8 to 1 mm) the batch is stirred for 4 hours by means of a high-speed stirrer. During this operation, the temperature rises to 60° C. in 2 hours. 50 parts of 30% strength hydrogen peroxide are then added in the course of 30 minutes whilst stirring, and the mixture is stirred for a further 1.5 hours. At this stage the temperature is 75° C.

The beads are then sieved off, reintroduced into 500 parts of water to remove adhering colorant, and separated off.

The aqueous suspension of the colorant is acidified to pH 5 with 10% strength sulfuric acid and the colorant is filtered off and washed neutral.

46 Parts of a red pigment are obtained; this product is very easily dispersed in a baking finish and gives transparent red colorations of excellent fastness. Because of its high transparency, the pigment thus obtained is particularly suitable for metallic-effect finishes.

EXAMPLE 7

50 Parts of the crude perylene-3,4,9,10-tetracarboxylic acid N,N'-bis-methylimide obtained as described in Example 1(a) are suspended, in the form of the moist press cake, in 3,000 parts of water and after adding 80 parts of 50% strength sodium hydroxide solution and 40 parts of sodium dithionite the mixture is heated to 40°, kept at this temperature for 1 hour and then cooled to room temperature, and the crystals which precipitate are filtered off. The filter residue, which contains the leuco form of perylene-3,4,9,10-tetracarboxylic acid N,N'-bis-methylimide, is washed with 1,000 parts of blank vat (a solution of 20 parts of 50% strength sodium hydroxide solution and 10 parts of sodium dithionite in 1,000 parts of water). The moist filter cake of the leuco form is suspended in a solution, at 60° C., of 40 parts of 50% strength sodium hydroxide solution, 20 parts of sodium dithionite and 3 parts of sodium dodecylbenzenesulfonate in 2,000 parts of water. After 15 minutes, 80 parts of sodium 3-nitrobenzenesulfonate are added at 60° C. and the leuco compound is oxidized. The suspension is filtered and the filter cake is washed neutral and dried at 70° C. Yield: 45 parts of a red pigment, which is easily dispersed in a baking finish and gives red colorations of excellent fastness.

We claim:

1. A process for the manufacture of a red pigment from perylene-3,4,9,10-tetracarboxylic acid N,N'-bis-methylimide which has been obtained by methylating the corresponding diimide or by fusing naphthalic acid N-methylimide with an alkali metal hydroxide, which comprises vatting a suspension of said N,N'-bis-methylimide with 0.5–1.5 times by weight of an alkali metal dithionite in the presence of up to 4 times by weight of an alkali metal hydroxide relative to the quantity of said ditionite, at a temperature of from room temperature to 100° C., to obtain the corresponding leuco compound, cooling the resulting solution to 20°–40° C., isolating and subsequently washing said leuco compound with fresh vatting solution until the solution is virtually colorless and clear and then, oxidizing said leuco compound.

2. A process according to claim 1, wherein the isolated and washed leuco compound is suspended in an alkali dithionite solution, in the presence of a dispersant selected from the group consisting of anionic, cationic and non-ionic dispersants, at from 20° to 100° C., and then oxidizing said suspension with air, hydrogen peroxide, or 3-nitrobenzene sulfonic acid at from 60° to 80° C.

3. A process as claimed in claim 2, wherein the leuco compound is suspended in a solution which contains from 0.6 to 1.5 parts by weight of sodium dithionite and from 1.0 to 3 parts by weight of 50% strength by weight sodium hydroxide solution per part by weight of leuco compound.

4. A process as claimed in claim 2, wherein the dispersant used is (a) an alkali metal salt of a higher fatty acid or resin acid, (b) an adduct of ethylene oxide with a higher fatty acid, a higher fatty acid amide, a higher fatty acid alkanol-amide, an aliphatic alcohol, an aliphatic mercaptan, an aliphatic amine, a rosin or a sperm oil alcohol, or a mixture of these adducts, or (c) the chloride, bisulfate, sulfate, methylsulfate, benzenesulfonate or toluenesulfonate of trialkylphenylammonium (where alkyl is of 1 to 4 carbon atoms), trialkylbenzylammonium (where alkyl is of 1 to 4 carbon atoms), dialkyldibenzylammonium (where alkyl is of 1 to 4 carbon atoms), alkyltrialkylammonium (where the first alkyl is of 10 to 20 carbon atoms and the other three are of 1 to 4 carbon atoms each), dialkyldibenzylammonium (where one alkyl is of 10 to 20 carbon atoms and the other is of 1 to 4 carbon atoms), trialkylammonium (where alkyl is of 1 to 4 carbon atoms) polyglycol ether, alkylpyridinium (where alkyl is of 12 to 18 carbon atoms) or N-alkylimidazolium (where alkyl is of 1 to 18 carbon atoms), or a mixture of these.

5. A process as claimed in claim 2, wherein the dispersant used is an adduct of from 20 to 30 moles of ethylene oxide with 1 mole of tallow fatty alcohol or from 4 to 7 moles of ethylene oxide with oleic acid.

6. A process as claimed in claim 2, wherein the oxidizing agent used is hydrogen peroxide sodium 3-nitrobenzenesulfonate, dilute nitric acid or alkali metal perborates.

7. A process as claimed in claim 1 wherein the isolated and washed leuco compound is milled, at from 20° to 100° C., in aqueous suspension in the presence of from 0.2 to 8% by weight relative to said leuco compound of a dispersant selected from the group consisting of anionic, cationic and nonionic dispersants or mixtures thereof, by means of glass beads, metal balls, ceramic balls, plastic balls or sand in the presence of an oxidizing agent, selected from the group consisting of air, hydrogen peroxide and sodium 3-nitrobenzenesulfonate.

8. A process as claimed in claim 7, wherein the dispersant used is (a) an alkali metal salt of a higher fatty acid or resin acid, (b) an adduct of ethylene oxide with a higher fatty acid, a higher fatty acid amide, a higher fatty acid alkanol-amide, an aliphatic alcohol, an aliphatic mercaptan, an aliphatic amine, a rosin or a sperm oil alcohol, or a mixture of these adducts, or (c) the chloride, bisulfate, sulfate, methylsulfate, benzenesulfonate or toluenesulfonate of trialkylphenylammonium (where alkyl is of 1 to 4 carbon atoms), trialkylbenzylammonium (where alkyl is of 1 to 4 carbon atoms), dialkyldibenzylammonium (where alkyl is of 1 to 4 carbon atoms), alkyltrialkylammonium (where the first alkyl is of 10 to 20 carbon atoms and the other three are of 1 to 4 carbon atoms each), dialkyldibenzylammonium (where one alkyl is of 10 to 20 carbon atoms and the other is of 1 to 4 carbon atoms), trialkylammonium (where alkyl is of 1 to 4 carbon atoms) polyglycol ether, alkylpyridinium (where alkyl is of 12 to 18 carbon atoms) or N-alkylimidazolium (where alkyl is of 1 to 18 carbon atoms), or a mixture of these.

9. A process as claimed in claim 7, wherein the dispersant used is an adduct of from 20 to 30 moles of ethylene oxide with 1 mole of tallow fatty alcohol or from 4 to 7 moles of ethylene oxide with oleic acid.

* * * * *